(12) United States Patent
Milner

(10) Patent No.: US 6,988,091 B2
(45) Date of Patent: Jan. 17, 2006

(54) METHOD AND SYSTEM FOR COORDINATION OF CAD DRAWINGS PROVIDING COLLISION DETECTION BETWEEN DRAWINGS

(75) Inventor: Roy Matthew Milner, Broken Arrow, OK (US)

(73) Assignee: Richard Levine, Valhalla, NY (US)

( * ) Notice: Subject to any disclaimer, the term of this patent is extended or adjusted under 35 U.S.C. 154(b) by 328 days.

(21) Appl. No.: 09/824,003

(22) Filed: Apr. 2, 2001

(65) Prior Publication Data

US 2002/0144204 A1 Oct. 3, 2002

(51) Int. Cl.
*G06F 15/18* (2006.01)

(52) U.S. Cl. .......................... 706/62; 706/45; 706/919
(58) Field of Classification Search ................ 706/62, 706/919, 45
See application file for complete search history.

(56) References Cited

U.S. PATENT DOCUMENTS

| 5,293,479 A | * | 3/1994 | Quintero et al. ............ 345/841 |
| 5,408,597 A | * | 4/1995 | Kita et al. .................. 345/440 |
| 5,444,836 A | * | 8/1995 | Hollingsworth et al. .... 345/634 |
| 5,493,679 A | * | 2/1996 | Virgil et al. ............. 707/104.1 |
| 2002/0089499 A1 | * | 7/2002 | Lee et al. .................. 345/419 |

OTHER PUBLICATIONS

Ponamgi et al., "Incremental Algorithms for Collision Detection Between Solid Models", Proceedings of the 3rd ACM Symposiu on Solid Modeling and Applications, 1995, pp. 293-304.*
Li et al., "Incremental 3D Collision Detection with Hierarchical Data Structures", Proceedings of the ACM Symposium on Virtua Reality Software and Technology, 1998, pp. 139-144.*
Manesh et al., "Automatic Vectorization of Scanned Engineering Drawings", Proceedings of the 1990 Symposium on Applied Computing, Apr. 1990, pp. 320-324.*
Gross et al., "Diagram Query and Image Retrieval in Design", Proceedings of the International Conference on Image Processing, Oct. 1995, vol. 2, pp. 308-311.*
Tsay et al., "A Personal Computer Graphical Environment for Industrail Distribution System Education, Design and Analysis", IEEE Transactions on Power Systems, vol. 15, No. 2, May 2000.*
Chen et al., "An Integration of Neural Network and Rule-Based Systems for Design and Planning of Mechanical Assemblies", IEEE Transactions on Systems, Man and Cybernetics, vol. 23, No. 5, Sep. 1993.*
Yang et al., "An Intelligent Symbol Usage Assistant for CAD Systems", IEEE Expert, Jun. 1994, vol. 9, Iss. 3, pp. 32-41.*
Chan et al., "The PEP-II Project-Wide Database", Proceedings of the 1995 Particle Accelerator Conference, May 1995, vol. 2, pp. 840-842.*
Hamdi-Cherif, A., "The CASCIDA Project: A Computer-Aided System Control for Interactive Design and Analysis", Mar. 1994 pp. 247-251.*

* cited by examiner

*Primary Examiner*—Wilbert L. Starks, Jr.
*Assistant Examiner*—Michael B. Holmes
(74) *Attorney, Agent, or Firm*—Ostrolenk, Faber, Gerb & Soffen, LLP

(57) ABSTRACT

A method and system of coordination between CAD drawings for collision checking purposes. By linking to a common data file structure in a central location, collisions can be detected between drawings whether the drawings are in the same computer, elsewhere on a network or, through data communications networks such as the internet, on the other side of the world. This process can be applied to any project where work in more than one CAD drawing is required.

38 Claims, 2 Drawing Sheets

METHOD AND SYSTEM FOR COORDINATION OF CAD DRAWINGS PROVIDING COLLISION DETECTION BETWEEN DRAWINGS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

The present invention generally relates to the field of Computer Aided Design and/or Drafting (CAD).

2. Background Information

Traditionally, the creation of drawings, especially on complex projects, has required coordination between those working on the project to prevent items or systems being designed from occupying the same physical space. The condition wherein two or more items occupy the same space has come to be known as a collision. Avoidance of collisions is extremely important on virtually all projects.

Prior to the present invention, the most complex collision detection systems for CAD could only coordinate items on a single drawing. This lack of multiple-drawing coordination created conflicts between workers when they came together for coordination meetings. Often, resolution of collisions requires considerable effort on the part of those involved, especially when a collision is not discovered for several days. In some cases, resolving collisions requires a complete re-design of a particular component or system.

BRIEF SUMMARY OF THE INVENTION

In view of the foregoing, the present invention, through one or more of its various aspects, embodiments and/or specific features or sub-components thereof is provided to bring about one or more objects and advantages, such as those specifically noted below.

A general object of this invention is to provide immediate notification to both parties involved in a collision so that they can resolve the collision with a minimum of effort.

A further object of this invention is to provide that immediate notification regardless of whether the CAD operators are in the same room or, through data communication networks such as the internet, in remote locations.

Another object of this invention is to allow for continuous collision checking with a large number of drawings at any given time, whether on a single computer or multiple computers. This expandability being limited only by the processing power of the computers involved.

DETAILED DESCRIPTION OF THE INVENTION

According to an aspect of the present invention, an apparatus and method are provided for coordinating details contained in multiple drawing files. These drawing files can be on one computer or spread out over multiple computers with a common PROJECT DIRECTORY for collision checking purposes.

Figure 1:
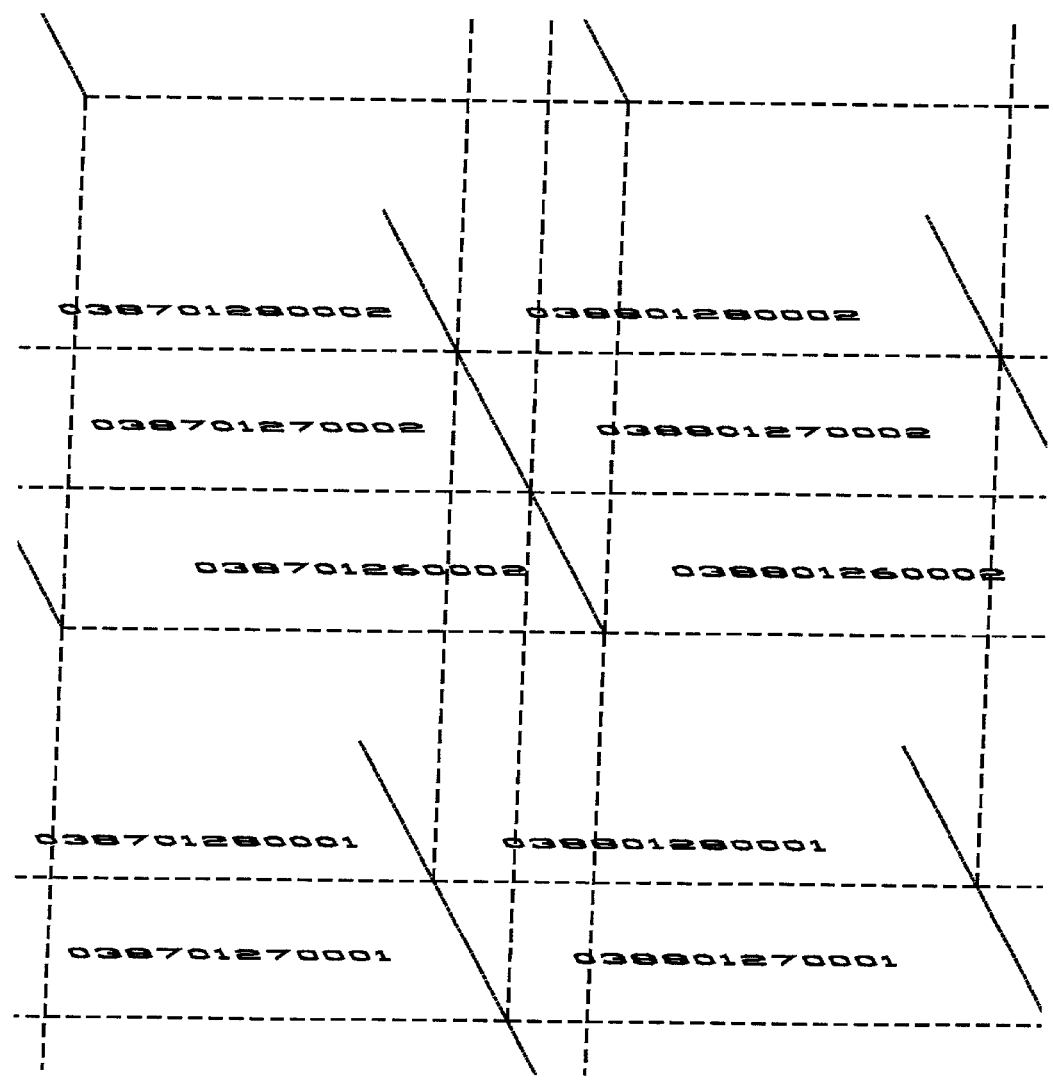
FIG. 1: Diagram showing 3-dimensional representation of computer file numbering system with respect to location of items in a CAD drawing

Under the present invention, collision data files from connected computers are placed in a common PROJECT DIRECTORY. These files are used to store drawing information and are given names pertaining to the originating drawing file name and the physical location of each item drawn. A file called 03880127.A, for example could pertain to an area of a specific size whose X-axis coordinates are represented by the first 4 digits of the file name and whose Y-axis coordinates are represented by the second four digits. In cases such as in the design of multi-story buildings, this naming structure can be extended to include the Z-axis (FIG. 1). The number of digits used to describe an area are not important as long as it is devisable by the number of coordinate axes represented. The numbers extracted from the file name are multiplied by a constant grid size to obtain a physical location within a drawing.

Let us say, for example that our grid size is a 5 meter square. By multiplying 5 times 388, we determine the X-axis coordinate to be 1940. Similarly the Y-axis coordinate is determined to be 127 times 5 or 635. Everything drawn in this area of drawing "A" is described within this file. If items cross more than one area, they are described in multiple files. As new items are drawn, they are added to the files and checked for collisions against items already in the files.

A central CATALOG FILE is maintained within the PROJECT DIRECTORY to designate which drawing file is code named "A", for example. As more drawings are added to the project, their code names are automatically created and added to the CATALOG FILE.

Each time an item is drawn, the present invention queries the PROJECT DIRECTORY for all files with the same COORDINATE CODE as the item being drawn. It may encounter files named 03880127.A, 03880127.B, and 03880127.C, for example. It then checks each of these files to determine whether it collides with items in them. If it collides with items in its own drawing, a local notification is activated telling the CAD operator the item collided with and flagging the items involved. Since no other drawing was involved, the CAD operator can resolve that collision without involving others or editing other drawing files. Should the present invention detect a collision with items in another drawing, the operator is notified. The information contained in the CATALOG FILE about the offending drawing is shown to the operator. The point of the collision is flagged and the operator is given a description of the item he hit along with an identity code and exact coordinates to assist the draftsman who drew that drawing in locating the item. The CAD operator may then either avoid the item by shifting an item in his drawing or contact the creator of the other drawing and have them move the item collided with. Alternatively, the CAD operator can post a COLLISION NOTICE in the PROJECT DIRECTORY which will activate a warning message each time someone opens any drawing file in which a collision exists, centering the offending area on the operator's screen and flagging the exact location of the collision.

Figure 2:
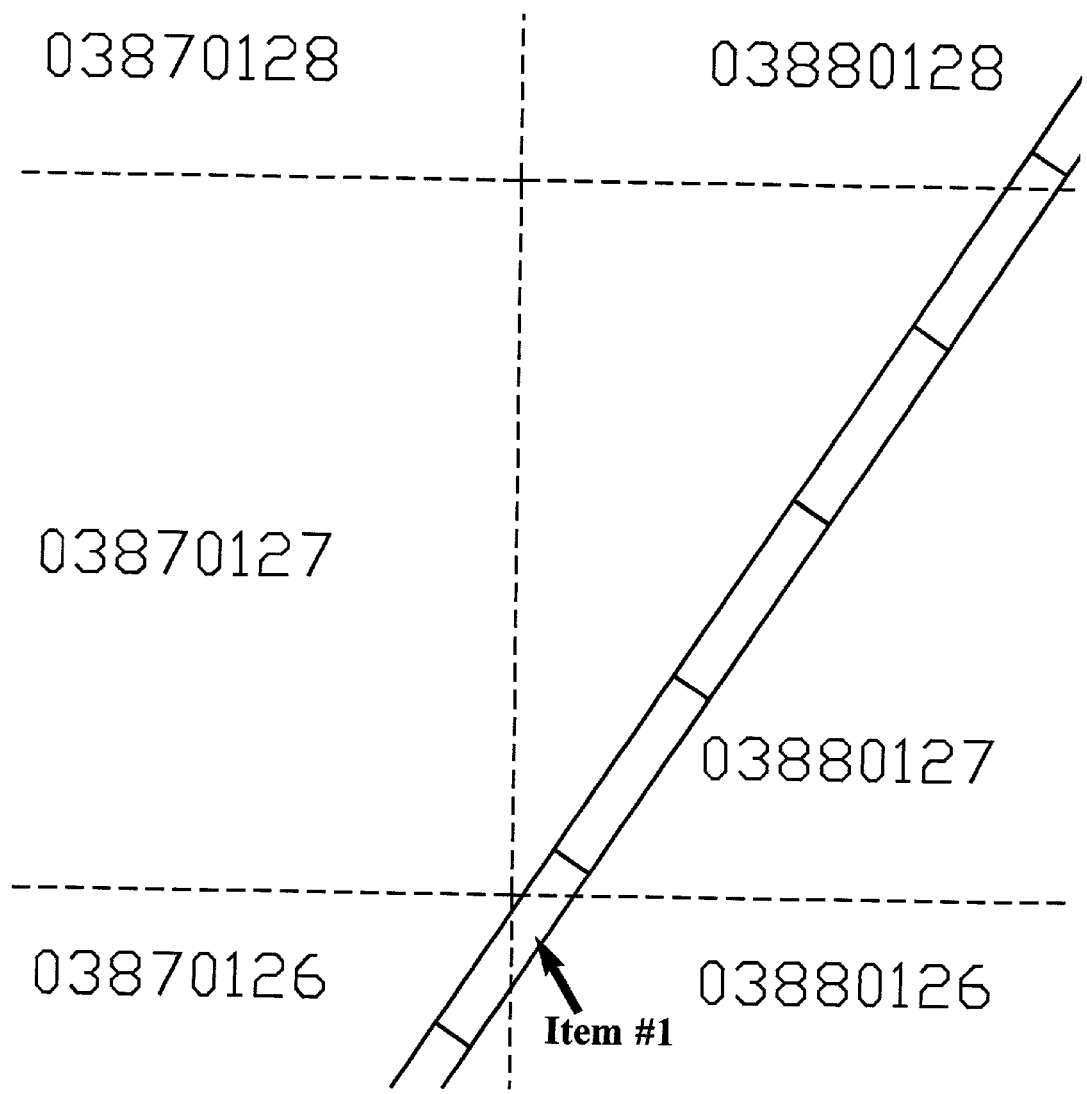
FIG. 2: Diagram showing a 2-dimensional application of computer file numbering system as it relates to items in a CAD drawing

In order to determine the COORDINATE CODE or codes to be used by a particular item, we must convert each item's boundary coordinates to map out its location within a grid. In FIG. 2, you can see a representation of a chain of items drawn across a CAD drawing. Each item is represented by a rectangle. The mapped areas of the CAD drawing are represented by the grid of dashed lines. These lines are for illustration of a concept only. The present invention does not actually draw these lines in the CAD drawing. Each section of the drawing is assigned a COORDINATE CODE. The code represents an area of the drawing sufficiently large enough to limit the number of files each item must check as it is drawn while being small enough to limit the number of items each file contains. On building size drawings a grid of 5 to 10 meters is usually adequate. Again in FIG. 2, notice how the first 4 digits increase as the grid progresses to the right while the last 4 increase as you move toward the top of the page. Using this method, you can map large projects such as airports without repeating numbered areas. Notice the rectangle, labeled item #1, which passes from area 03870126, through 03880126, into 03880127. Under this system, information about this item would be contained in 3 different files.

Once the COORDINATE CODES have been determined for an item, we assign the code for this drawing. If the DRAWING CODE is not known, we check the CATALOG FILE to see if this drawing is listed. If the drawing is found, we use the code previously assigned to this drawing. If it is not listed, we assign a code to this drawing and list it in the CATALOG FILE, along with the name of the drawing, its file location, and the contact information of the person creating the drawing.

Once we have a DRAWING CODE, we create file names by appending a period and the DRAWING CODE to each of the COORDINATE CODES.

One by one, we check to see if the COORDINATE FILES for this item exist. If a file exists, we step through the file, checking for collision with each item in the file and append information about this new item to the file. If the file does not exist, we create it, placing information about our item into the new file.

Next, we look for data files from other drawings with the same COORDINATE CODE as the area we are drawing in. This is done by searching for files whose root name is our COORDINATE CODE regardless of the file extension (03880127. * for example) within our PROJECT DIRECTORY. If such files exist, we step through each file comparing its items to our item for collision. Since these files represent other drawings, we make no changes to them.

The data for each item should contain several elements. It should contain an IDENTITY CODE so that the item can be accurately identified in its originating drawing. The IDENTITY CODE allows coordinating draftsmen to run computer searches of drawings to quickly identify and zero in on objects involved in collisions. The IDENTITY CODE also allows the present invention to be aware of items attached to it and ignore them for collision checking purposes. In FIG. 2, you will notice we have several rectangles linked end to end representing a chain of items in our drawing. We do not wish to be told they collide whenever we attach one to another. They are legitimately touching. Therefore, each item should be aware of those it is connected to and ignore those items for collision checking purposes. This is done by compiling a list of connected items and passing that list to the present invention to be ignored.

Another element that should be included in the data representing each item is a DESCRIPTION of each item. This is important since it allows the present invention to tell the operator what he hit.

Another element that should be included in the data representing each item is a LIST OF POINTS representing the edges of the item 3-dimensionally.

Given a list of points, there are several methods one can use to determine intersection. Since it is the act of determining intersection based upon the central file system and not the method used, no specific means is cited.

With the present invention, the operator is allowed to specify a distance he wishes to maintain between objects. When items pass within that range, but do not actually collide, the operator is issued a warning message and informed how close items are. This warning system extends the LIST OF POINTS in outward directions (x, y, and z) before checking for intersection.

Because this system stores simple data strings in specifically named files, collision checking can be performed very quickly as items are being drawn. With modem computers, this process is fast enough not to be noticed by the user. The present invention can check items in any drawing whether or not the item is currently visible to the operator.

By linking computers in a virtual network, including those connected through the internet, this system can be used to coordinate drawing efforts of draftsmen working anywhere in the world.

What is claimed is:

1. A method of checking for collision between items in one or more CAD (computer aided design) drawings generated by a CAD system relating to a project, comprising:

establishing a coordinate system by dividing a space represented by each CAD drawing into a multi-dimensional grid defining grid elements;

assigning a coordinate code to each new item drawn in the space;

assigning data to each item identifying edges of the item in the space in three dimensions;

creating a coordinate file for each new item in a drawing based on the coordinate code for the item;

checking the coordinate file for each new item to determine if the coordinate file already exists and if so, determining if there is a collision between the new item and existing items in the coordinate file based on the edge identifying data and adding the new item to the coordinate file; and providing an indication of a collision if the edge identifying data indicates that two items occupy the same location within a grid element.

2. The method of claim 1, further comprising:

assigning a drawing code to each drawing relating to the project;

listing each drawing in a catalog file of drawings;

further wherein the step of creating a coordinate file comprises creating a coordinate file for each new item in a drawing based on the coordinate code for the item and the drawing code; and determining if a collision exists with items having the same coordinate code in other drawings based on the edge identifying data.

3. The method of claim 1, wherein the multidimensional grid has two or three dimensions.

4. The method of claim 1, further comprising assigning an identity code to each item identifying the item.

5. The method of claim 1, further comprising assigning a code identifying items that are attached, connected or touching each other so that collisions between such items are ignored.

6. The method of claim 1, further comprising assigning data to each item providing a description of each item.

7. The method of claim 1, wherein the data identifying edges of each item comprises a list of points representing the edges of each item in three dimensions.

8. The method of claim 7, further comprising specifying a distance to be maintained between objects so that when items pass within the distance but do not collide, a warning is issued.

9. The method of claim 8, further comprising, when items pass within the distance, but do not collide, specifying how close the items are.

10. The method of claim 8, wherein the specified distance is added to the list of points in each dimension to extend the list of points before checking for collisison.

11. The method of claim 1, wherein drawings are located on separate computers connected by a network.

12. The method of claim 1, wherein each coordinate file has a part indicating a physical location and another part indicating a drawing source.

13. The method of claim 1, further wherein the indication of collision identifies the item collided with and flags the items in the collision.

14. The method of claim 2, further wherein if a collision is detected with an item in another drawing, indicating the catalog file in which the drawing having the collision is located and providing data identifying the item involved in the collision.

15. The method of claim 14 further comprising providing an identity code and coordinates of the item in the other drawing involved in the collision.

16. The method of claim 15, further comprising using a CAD system to move an item in a drawing drawn on the CAD system to avoid the collision or having an item moved in another drawing on another CAD system to avoid the collision.

17. The method of claim 15, further comprising posting a warning message that a collision exists that is activated each time a drawing file in which a collision exists is opened.

18. The method of claim 17, further comprising centering the area of the collision on a display device of the CAD system when the drawing file is opened.

19. The method of claim 11, wherein the network is the Internet.

20. Apparatus for checking for collision between items in one or more CAD (computer aided design) drawings generated by a CAD system relating to a project, comprising:
computer software for operation on the CAD system for:
establishing a coordinate system by dividing a space represented by each CAD drawing into a multidimensional grid defining grid elements;
assigning a coordinate code to each new item drawn in the space;
assigning data to each item identifying edges of the item in the space in three dimensions;
creating a coordinate file for each new item in a drawing based on the coordinate code for the item;
checking the coordinate file for each new item to determine if the coordinate file already exists and if so, determining if there is a collision between the new item and existing items in the coordinate file based on the edge identifying data and adding the new item to the coordinate file; and
providing an indication of a collision if the edge identifying data indicates that two items occupy the same location within a grid element.

21. The apparatus of claim 20, further wherein the computer software performs the steps of:
assigning a drawing code to each drawing relating to the project; and
listing each drawing in a catalog file of drawings;
further wherein the computer software implements the step of creating a coordinate file by creating a coordinate file for each new item in a drawing based on the coordinate code for the item and the drawing code; and
further wherein the computer software determines if a collision exists with items having the same coordinate code in other drawings based on the edge identifying data.

22. The apparatus of claim 20, wherein the multidimensional grid has two or three dimensions.

23. The apparatus of claim 20, further wherein the computer software assigns an identity code to each item identifying the item.

24. The apparatus of claim 20, further wherein the computer software assigns a code identifying items that are attached, connected or touching each other so that collisions between such items are ignored.

25. The apparatus of claim 20, further wherein the computer software assigns data to each item providing a description of each item.

26. The apparatus of claim 20, wherein the data identifying edges of each item comprises a list of points representing the edges of each item in three dimensions.

27. The apparatus of claim 26, further wherein the computer software specifies a distance to be maintained between objects so that when items pass within the distance but do not collide, a warning is issued.

28. The apparatus of claim 27, further wherein, when items pass within the distance, but do not collide, the computer software specifies how close the items are.

29. The apparatus of claim 28, wherein the specified distance is added to the list of points in each dimension to extend the list of points before checking for collisison.

30. The apparatus of claim 20, wherein drawings are located on separate computers connected by a network.

31. The apparatus of claim 20, wherein each coordinate file has a part indicating a physical location and another part indicating a drawing source.

32. The apparatus of claim 20, further wherein the indication of collision identifies the item collided with and flags the items in the collision.

33. The apparatus of claim 21, further wherein, if a collision is detected with an item in another drawing, the computer software indicates the catalog file in which the drawing having the collision is located and provides data identifying the item involved in the collision.

34. The apparatus of claim 33 further wherein the computer software provides an identity code and coordinates of the item in the other drawing involved in the collision.

35. The apparatus of claim 34, further wherein the computer software moves an item in a drawing drawn on the CAD system in response to user input to avoid the collision or requests that an item be moved in another drawing on another CAD system to avoid the collision.

36. The apparatus of claim 34, further wherein the computer software posts a warning message that a collision exists that is activated each time a drawing file in which a collision exists is opened.

37. The apparatus of claim 36, further wherein the computer software centers the area of the collision on a display device of the CAD system when the drawing file is opened.

38. The apparatus of claim 30, wherein the network is the Internet.

* * * * *